United States Patent [19]

Bartoli et al.

[11] Patent Number: 5,353,351

[45] Date of Patent: Oct. 4, 1994

[54] SECURE TELECONFERENCING

[75] Inventors: Paul D. Bartoli, Red Bank; Bruce E. McNair, Holmdel, both of N.J.

[73] Assignee: AT&T Bell Laboratories, Murray Hill, N.J.

[21] Appl. No.: 896,520

[22] Filed: Jun. 9, 1992

[51] Int. Cl.⁵ .................... H04L 9/18; H04M 3/56
[52] U.S. Cl. ........................ 380/33; 380/43; 379/202
[58] Field of Search ............. 380/33, 46, 47, 41, 380/52, 43; 379/202

[56] References Cited

U.S. PATENT DOCUMENTS

| | | | |
|---|---|---|---|
| 3,818,139 | 6/1974 | Snyder | 379/202 |
| 3,937,898 | 2/1976 | Presto et al. | |
| 3,970,797 | 7/1976 | Johnson et al. | |
| 4,163,871 | 12/1977 | Maggi | |
| 4,215,247 | 1/1978 | Lambert | |
| 4,225,956 | 8/1978 | Betts et al. | |
| 4,229,814 | 7/1978 | Betts | |
| 4,230,908 | 1/1979 | Davis et al. | |
| 4,405,829 | 9/1983 | Rivest et al. | |
| 4,424,414 | 1/1984 | Hellman et al. | |
| 4,845,749 | 7/1989 | Brickell et al. | 380/46 |
| 4,860,351 | 8/1989 | Weingart | 380/3 |
| 4,920,565 | 4/1990 | Strawczynski et al. | |
| 5,003,593 | 3/1991 | Mihm, Jr. | 380/46 X |
| 5,020,098 | 5/1991 | Celli | |
| 5,128,928 | 7/1992 | Wilder et al. | |

OTHER PUBLICATIONS

Brickell, E. F. et al., "N-Party Audio Secrecy, Identification And Signature," Globe Com. 1987, pp. 103–107.
Steer, D. G. et al., "A Secure Audio Teleconference System," Military Comm. Conference Proc. 1988, Oct. 23–26, 1988, pp. 3.5.1–3.5.5.
Jayant, N. S. et al., "A Comparison of Four Methods for Analog Speech Privacy," IEEE Trans. on Comm., vol. Com. 29, No. 1, Jan. 1981, pp. 18–23.
"DES Modes of Operation," U.S. Dept. of Commerce, Nat'l Bur. of Standards, Federal Information Processing Standards Publication FIPS Pub 81, Dec. 2, 1980, pp. 1–26.
Steer, D. G. et al., "A Secure Audio Teleconference System," CRYPTO 1988, pp. 520–528.
Jayant, N. S. et al., "Analog Scramblers for Speech Based on Sequential Permutations in Time and Frequency," The Bell System Technical Journal, Jan. 1983, pp. 25–61.
Cox, R. V. et al., "The Analog Voice Privacy System," AT&T Technical Journal, Jan./Feb. 1987, vol. 66, Issue 1, pp. 119–135.

Primary Examiner—Gilberto Barrón, Jr.
Attorney, Agent, or Firm—Eugene S. Indyk

[57] ABSTRACT

Secure teleconferencing between three or more parties is achieved by receiving encrypted information streams from each of the parties to the conference. The encrypted information streams are received in decryption/re-encryption units co-located with a conference bridge established in a telecommunication switching system in a public switched telephone network central office. The decryption/re-encryption units decrypt the information streams and then re-encrypt those information streams in accordance with a common conference encryption algorithm. The re-encryption processes for the information streams are synchronized so that the re-encryption circuitry for all information streams are in the same cryprostate at all times during the re-encryption procedure. The decryption/re-encryption units are located in secure surroundings to protect the unencrypted information streams present in those units. A gating circuit permits only one of the re-encrypted information streams to be input to the conference bridge at a given time. A circuit which simulates the operation of a silent conferee prevents noise bursts from being sent to the conferees during periods of time when all are silent.

23 Claims, 3 Drawing Sheets

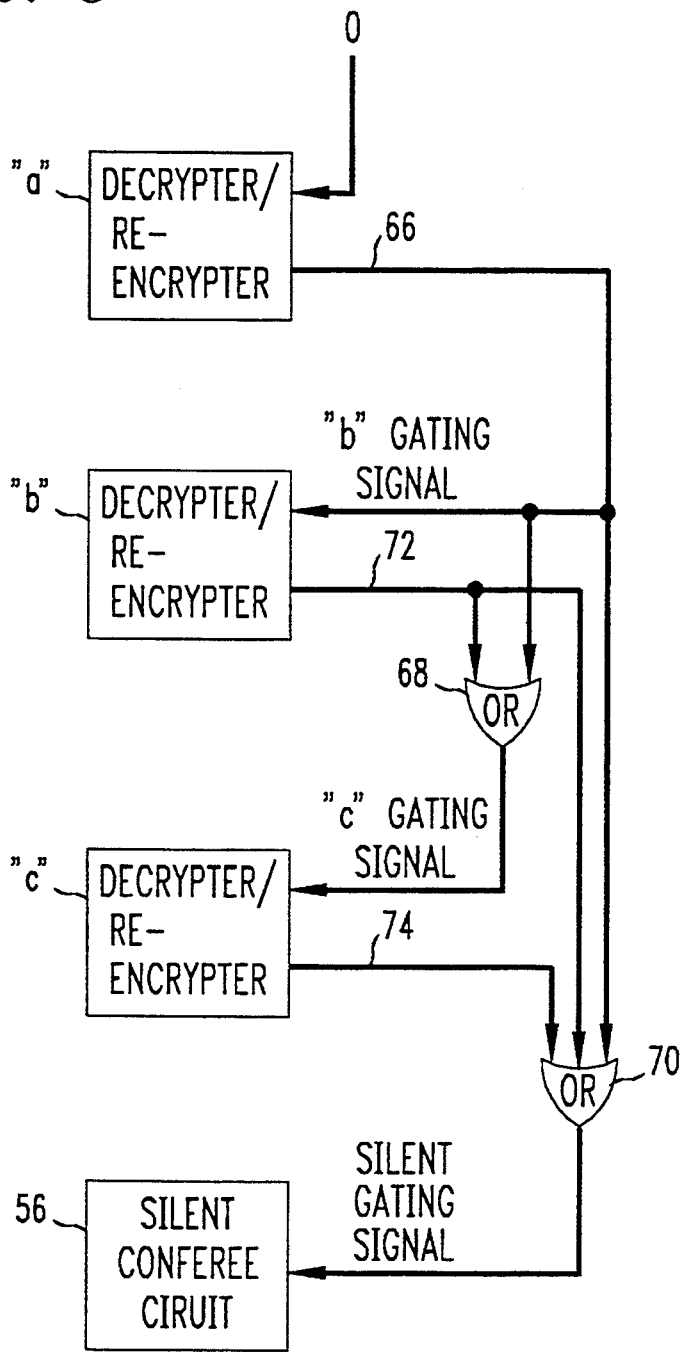

SECURE TELECONFERENCING

TECHNICAL FIELD

This disclosure relates to teleconferencing between three or more parties in a telephone network. More particularly, this disclosure relates to a practical, secure, and cost effective solution to a long standing problem of simultaneous connection of three or more parties in a network where the transmissions of those parties are encrypted for security purposes.

BACKGROUND

Teleconferencing between three or more parties using unencrypted transmissions is a relatively straightforward task of combining the audio signals from each conferee in a conference bridge which can be viewed as a simple summing junction. The conference bridge adds the unencrypted audio contributions from each conferee and redirects the sum of those contributions back to the conferees, so that each conference can hear what the others are saying.

In a teleconference where the conferees are transmitting encrypted signals, however, significant problems are introduced which indicate that use of conventional teleconferencing bridges is either difficult or impossible. First, there is the problem of synchronizing the encryption equipment of all the conferees so that it is possible for them to communicate with each other. This is a particularly difficult problem where one or more of the conferees is mobile. Second, there is no way to simply sum the encrypted information streams from the conferees and still obtain a useful teleconference situation with strong encryption. This is because strong encryption must be a non-linear process and the usual super position assumptions cannot be made. In mathematical terms, if $E(*)$ is an encryption function and A, B, and C are three information streams representing the contributions of the conferees, then $E(A)+E(B)+E(C) \cdot E(A+B+C)$ when $E(*)$ is a strong and secure non-linear encryption function. There, thus, is no way to build a conventional conference bridge for encryption information.

One attempt to solve these problems involves decrypting the information stream from each conferee at the input of the conference bridge. The decrypted information then is combined by the conference bridge in the usual fashion. The difficulty with this approach is that the conference bridge is now processing sensitive, unprotected traffic which could be compromised by unscrupulous individuals who gain access to the bridge. Enhancing the security of such an arrangement is complex and costly because the design of the switching system which implements the conference bridge must be protected against unauthorized intrusion and the staff which operates the switching system must be limited and cleared to access the information involved in the conference. In the case of highly-classified or compartmentalized information, where access is strictly limited to those who have a genuine need-to-know, it may be impossible to staff the switching system with properly cleared personnel. The only alternative provided by prior technology is to perform the secure conferencing function on one of the conferees' premises. Although this may solve security problems, it is clearly not efficient and it limits the size of the secure conference which may be obtained.

SUMMARY

The problems associated with teleconferencing involving encrypted signals are solved by an apparatus and method which includes, in one example of the invention, decrypting the encrypted information streams produced by the participants of a secure teleconference and then re-encrypting the decrypted information streams. The circuits which perform the decryption and re-encryption are arranged so that they may easily be synchronized prior to introduction of encrypted information streams to a conference bridge. In another example of the invention, an encrypted information stream from each conferee is gated to a conference bridge only when all other conferees are silent. This avoids the problems associated with superposing nonlinear signals. In yet another example of the invention, a special silent conferee circuit directs encrypted silence to the conference bridge when all other conferees are silent. This avoids a problem involving noise bursts which may be perceived by the conferees when all are silent.

BRIEF DESCRIPTION OF THE DRAWINGS

FIG. 3 shows another example of the invention involving the conferees having different priority access to a conference bridge like the conference bridge in FIG. 1.

DETAILED DESCRIPTION

Figure 1:
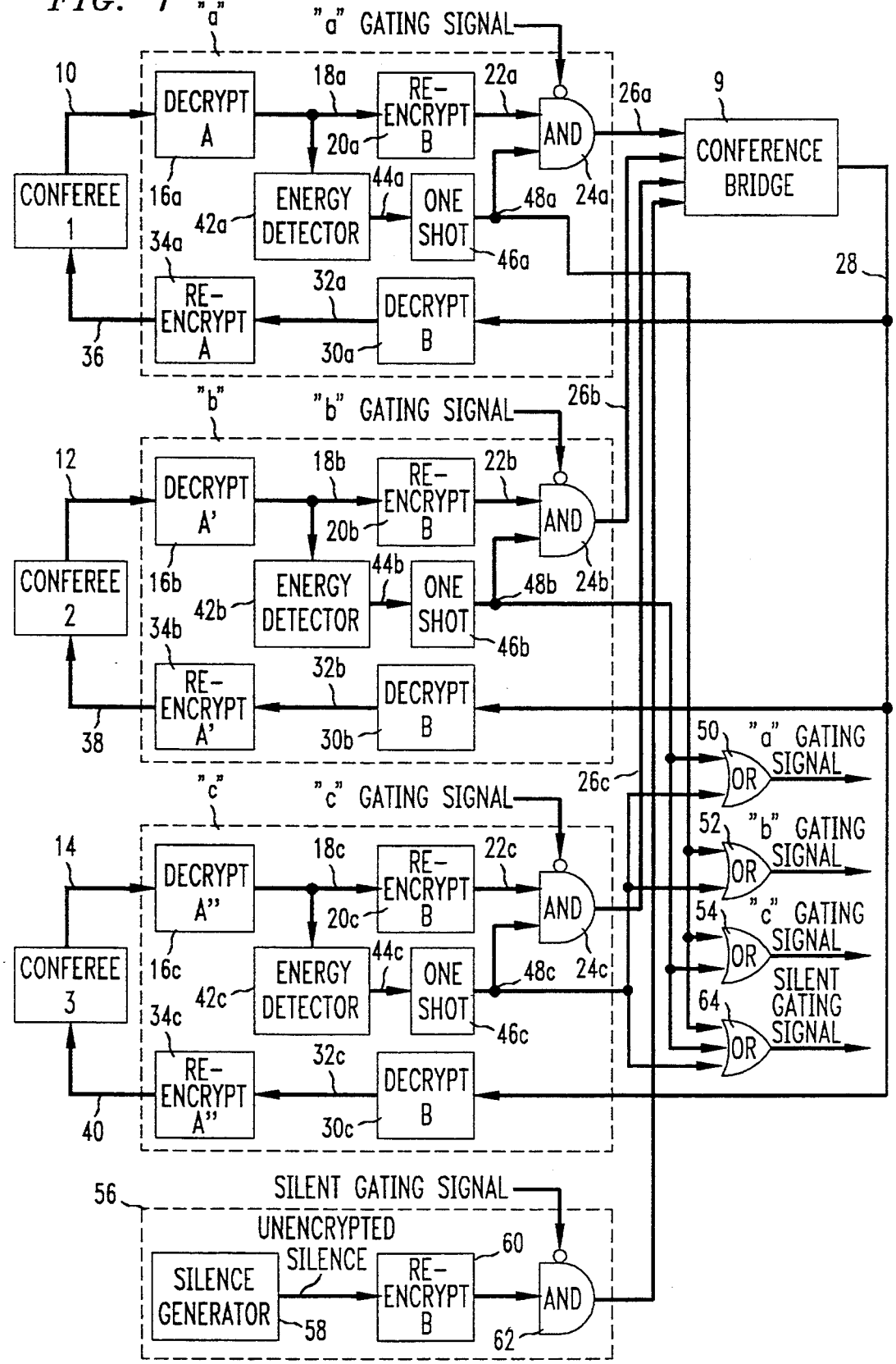
FIG. 1 is a detailed block diagram of an example of a teleconferencing apparatus using encrypted information streams from the conferees in accordance with this invention.

FIG. 1 is a detailed block diagram of a secure teleconferencing apparatus in accordance with this invention. The apparatus of FIG. 1 permits a three-way encrypted teleconference to be set up between three conferees numbered 1, 2, and 3 in FIG. 1. Although only three conferees are shown in FIG. 1, the circuitry of FIG. 1 may be extended to any number of conferees greater than the three shown. Conferee 1 produces an encrypted information stream on a line 10 which is connected to an input of a decryption/re-encryption unit "a". The information stream on line 10 is encrypted by conferee 1 in accordance with an encryption algorithm A which provides a desired level of security for the information stream produced by conferee 1. One example of a conferee encryption algorithm which may be used is an algorithm operating in accordance with the Data Encryption Standard promulgated by the National Bureau of Standards of the U.S. Commerce Department, currently known as The National Institute of Standards and Technology. The unit "a" decrypts the information stream from conferee 1 in accordance with the conferee encryption algorithm A and re-encrypts the decrypted information stream in accordance with a conference encryption algorithm B for input to a conference bridge 9. Conferee 2 also produces an encrypted information stream on a line 12 which is connected to an input of a decryption/re-encryption unit "b". The information stream on line 12 is encrypted by conferee 2 in accordance with an encryption algorithm A' which may be the same as or different from the encryption algorithm A of conferee 1. Unit b decrypts the information stream from conferee 2 and re-encrypts the decrypted information stream in accordance with the conference encryption algorithm B for input to the conference bridge 9. Conferee 3 likewise produces an encrypted information stream on a line 14 which is connected to an input of a decryption/re-encryption unit "c". The information stream on line 14 is encrypted by conferee 3 in accordance with an encryption algorithm A' which may be different from or the same as one or both of conferee encryption algorithms A and A'. Unit c decrypts the information from conferee 2 and re-encrypts the decrypted information stream in accordance with the conference encryption algorithm B for input to the conference bridge 9.

In more specific terms, a decrypter 16a receives the encrypted information stream from conferee 1 and decrypts that information in accordance with the conferee algorithm A. The decrypter 16a produces an unencrypted information stream on a line 18a which is directed to an input of a re-encrypter 20a which re-encrypts the information stream on line 18a in accordance with the conference encryption algorithm B. An encrypted information stream produced in accordance with algorithm B is directed on line 22a to one noninverting input of an AND gate 24a. In like fashion, an information stream encrypted in accordance with the conferee encryption algorithm A' on line 12 from conferee 2 is directed to the input of a decrypter 16b which decrypts the information stream in accordance with algorithm A' and produces an unencrypted information stream on a line 18b. The unencrypted information stream on line 18b is re-encrypted in accordance with the conference encryption algorithm B in a re-encrypter 20b. The re-encrypter 20b produces an encrypted information stream on line 22a which is connected to one noninverting input of an AND gate 24b. Similarly, an information stream encrypted in accordance with the conferee encryption algorithm A' from conferee 3 on line 14 is directed to the input of a decrypter 16c which decrypts the information stream in accordance with algorithm A' and produces an unencrypted information stream on a line 18c. The unencrypted information stream on line 18c is directed to the input of a re-encrypter 20c which encrypts the information stream on line 18c in accordance with the conference encryption algorithm B and directs the encrypted information stream on a line 22c to one noninverting input of an AND gate 24c.

As is described in more detail below, the AND gates 24a, 24b, and 24c selectively direct the re-encrypted information streams from conferees 1, 2, and 3 appearing on lines 22a, 22b, and 22c, respectively, to the input of the conference bridge 9 via output lines 26a, 26b, and 26c. The conference bridge 9 combines the signals on lines 26a, 26b, and 26c and produces a conference output signal on lines 28 which is connected back to the decryption/re-encryption units "a", "b", and "c". The conference bridge 9 is a circuit configuration which may be set up by a telecommunications switching system which is located in a central office of a public switched telephone network. Public switched telephone networks may comprise one or more of such switching systems which are configured to provide one or both of local telephone service or long distance telephone service. The conference bridge 9 and other circuitry shown in FIG. 1 may be set up for any convenient one of the plurality of switching systems making up a public switched telephone network.

The conference output signal on line 28 represents a summation of the signal contributions made by conferees 1, 2, and 3 in the three-way call depicted in FIG. 1. The output signal on line 28 is directed to an input of a decrypter 30a which decrypts the conference output signal on line 28 in accordance with the encryption algorithm B. This decrypted conference output signal is directed on a line 32a to an input of a re-encrypter 34a. The re-encrypter 34a encrypts the signal on line 32a in accordance with the encryption algorithm A. The re-encrypter 34a sends an encrypted information stream representing the conference output on line 28 back toward conferee 1 on line 36. The conferee 1 then decrypts the information stream on line 36 to hear what the other conferees say in the course of the conference call.

The output signal on line 28 is also directed to an input of a decrypter 30b which decrypts the conference output signal on line 28 in accordance with the encryption algorithm B. This decrypted conference output signal is directed on a line 32b to an input of a re-encrypter 34b. The re-encrypter 34b encrypts the signal on line 32b in accordance with the encryption algorithm A'. The re-encrypter 34b sends an encrypted information stream representing the conference output on line 28 back toward conferee 2 on line 38. The conferee 2 then decrypts the information stream on line 38 to hear what the conferees 1, 2, and 3 say in the course of the conference call.

The output signal on line 28 is also directed to an input of a decrypter 30c which decrypts the conference output signal on line 28 in accordance with the encryption algorithm B. This decrypted conference output signal is directed on a line 32c to an input of a re-encrypter 34c. The re-encrypter 34c encrypts the signal on line 32c in accordance with the encryption algorithm A'. The re-encrypter 34c sends an encrypted information stream representing the conference output on line 28 back toward conferee 3 on line 40. The conferee 3 then decrypts the information stream on line 40 to hear the summed contributions of the conferees 1, 2, and 3.

Figure 2:
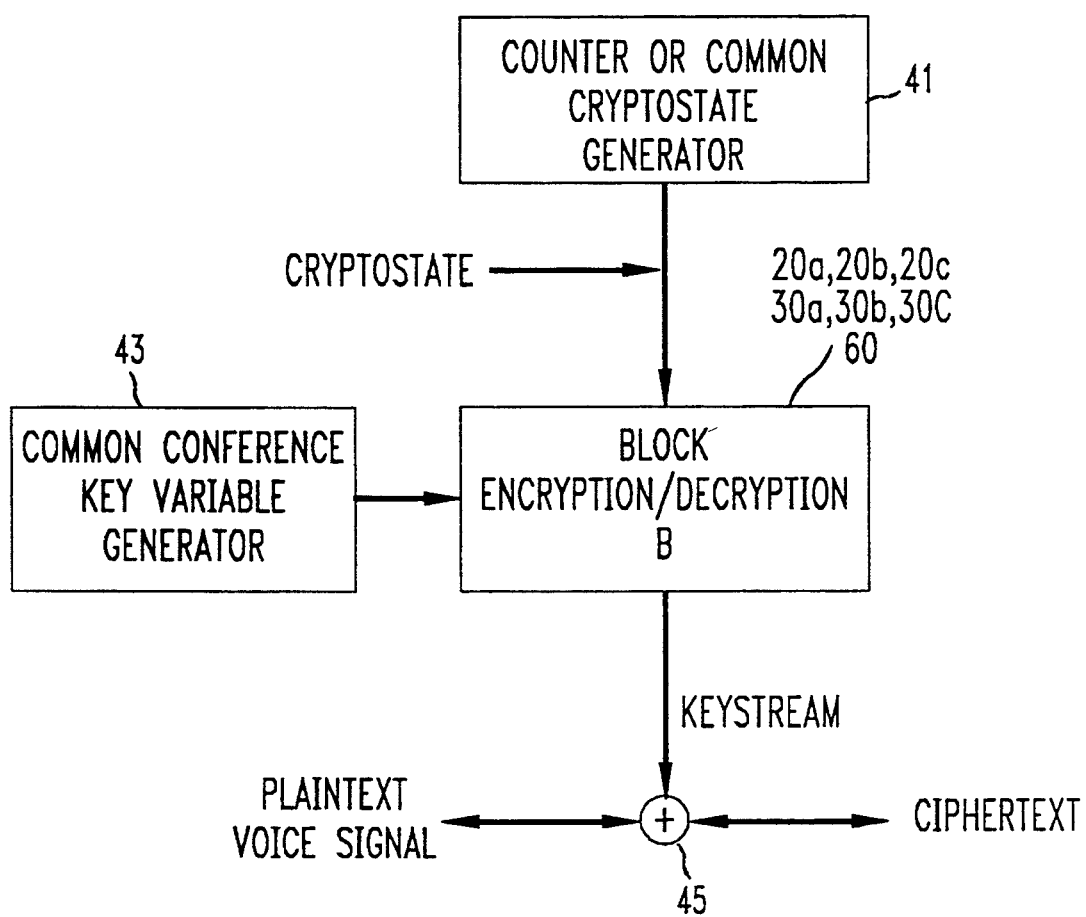
FIG. 2 illustrates an example of an apparatus which synchronizes the operation of the decryption/re-encryption units of FIG. 1.

The problems associated with maintaining the encryption equipment of the conferees in synchronism for there to be an effective conference bridge carrying encrypted information is solved by the arrangement of FIG. 1 because the decryption/re-encryption units are co-located at the conference bridge or are otherwise maintained in some known and fixed location with respect to the conference bridge. The encryption equipment in the units "a", "b", and "c" may be kept in synchronism by controlling the crypto state of the encryption and decryption equipment in each unit "a", "b", and "c" operating in accordance with algorithm B with a single crypto state generator which commonly drives all of that equipment. More specifically, the re-encrypters 20a, 20b, and 20c and the decryptors 30a, 30b, and 30c are kept in synchronism by using the same encryption algorithm B with the same key variable and with maintenance of identical crypto states. See FIG. 2. In FIG. 2, the encryptors 20a, 20b, and 20c and the decryptors 30a, 30b, and 30c (and also an encryptor 60 described below) are schematically represented by a single block encryption/decryption circuit. Each of those encryptors and decryptors receives the same crypto state signal from a counter or other common crypto state generator 41. Each of those encryptors and decryptors also receives the same conference key variable from a common conference key variable generator 43 over a respective secure channel, such as a secure channel which would be provided by a channel operating in accordance with ANSI Standard X9.17. The encryptors and decryptors each produce a keystream which is directed to an input of a logic element 45, which may be an exclusive OR gate. Although not shown in FIG. 2, there is a logic element 45 associated with each of the encryption circuits 20a, 20b, and 20c, the decryption circuits 30a, 30b, and 30c (and the encryption circuit 60 described in detail below). In the encryptors, logic element 45 receives the keystream and an unencrypted plain text signal and produces an encrypted cipher text signal. In the decryptors, the logical element 45 receives the keystream and an encrypted cipher text signal and produces an unencrypted plain text signal. In one example of the invention, encryption algorithm B may be a block encryption algorithm, which may be designed in accordance with the previously mentioned data encryption standard, operated in a cipher feedback (cipher text autokey - CTAK) mode or operated in a counterdriven mode.

One advantage of the arrangement of FIG. 1 is that there is only a limited amount of exposure of unencrypted information in the public telephone network, namely, unencrypted information appears only on lines 18a, 18b, 18c, 32a, 32b, and 32c. It is much easier to protect such areas than to protect an entire switching system containing a conference bridge which handles such unencrypted information. The unencrypted information streams on lines 18a, 18b, 18c, 32a, 32b, and 32c may be protected by placing the decryption/re-encryption units "a", "b", and "c" in one or more secure, tamper proof housings. Preferably, each decryption/re-encryption units "a", "b", and "c" is placed in its own tamper-proof enclosure. For example, each of the decryption/re-encryption units "a", "b", and "c" may be encapsulated in epoxy with suitable measures taken to prevent unscrupulous individuals from gaining access to the encapsulated circuitry and from gaining useful information in the event that access is gained and the encapsulation is breached.

The circuit of FIG. 1 includes a gating arrangement which permits only one conferee at a time to gain access to the conference bridge 9. While one conferee is talking and is connected to the conference bridge 9, none of the other conferees is given access to the bridge 9. A conferee not having current access to the conference bridge 9 may only be given access when all of the conferees are silent. Once a conferee has gained access to the conference bridge 9, no other conferee is permitted to access bridge 9. This arrangement solves the problem of not being able to superpose a plurality of non-linear signals in a conventional conference bridge.

To accomplish the gating of only single conferees to the conference bridge 9, the decryption/re-encryption units "a", "b", and "c" include voice energy detectors 42a, 42b, and 42c, respectively. The voice energy detectors 42a, 42b, and 42c receive the unencrypted signals on lines 18a, 18b, and 18c, respectively, and produce trigger signals on lines 44a, 44b, and 44c when the presence of voice energy is detected on lines 18a, 18b, and 18c. Trigger signals on lines 44a, 44b, and 44c trigger one shots 46a, 46b, and 46c, respectively. Triggering of the one shots 46a, 46b, and 46c causes respective output lines 48a, 48b, and 48c to make a transition from a low state to a high state. Output lines 48a, 48b, and 48c are connected to respective noninverting inputs of AND gates 24a, 24b, and 24c. A low state on these inputs prevents respective information streams from respective conferees from being sent to the input of the conference bridge 9. A high state on any of these inputs opens respective AND gates 24a, 24b, and 24c to permit the information streams from a respective one of the re-encryptions 20a, 20b, and 20c to be directed into the conference bridge 9 only if permitted to do so by the state of another gating signal directed to an inverting input of each of the AND gates 24a, 24b, and 24c. Each of those additional gating signals prevents signals from a respective re-encrypter 20a, 20b, and 20c from being passed through to the conference bridge 9 when one of the other conferees has gained access to bridge 9.

In specific terms, when the voice energy detector 42a finds that there is voice energy present on line 18a, a trigger signal is produced on line 44a which triggers the one shot 46a which then causes in the gating signal produced on line 48a to make a transition from a low state to a high state. The gating signal is connected to a non-inverting input of the AND gate 24a. The AND gate 24a permits an information stream at the output of re-encryptor 20a to be passed through to the input of the conference bridge 9 on line 26a if the "a" gating signal connected to an inverting input of AND gate 24a is low. The "a" gating signal will be low only if neither of conferees 2 or 3 has obtained access to the bridge and is speaking when conferee 1 begins to speak and is attempting to access the conference bridge. This "a" gating signal is produced by directing the outputs of the one shots 46b and 46c on lines 48b and 48c to the non-inverting inputs of an OR gate 50 which then produces the "a" gating signal on its output as shown in FIG. 1.

Similarly, when the voice energy detector 42b determines that there is voice energy present on line 18b, a trigger signal is produced on line 44b triggering the one shot 46b which then causes the gating signal produced on line 48b to make a transition from a low state to a high state. The gating signal is connected to a non-inverting input of the AND gate 24b. The AND gate 24b permits an information stream at the output of re-encrypter 20b to be passed through to the input of the conference bridge 9 on line 26b if the "b" gating signal connected to an inverting input of AND gate 24b is low. The "b" gating signal will be low only if neither of conferees 1 or 3 has obtained access to the bridge and is speaking when conferee 2 begins to speak and is attempting to access the conference bridge. This "b" gating signal is produced by directing the outputs of the one shots 46a and 46c on lines 48a and 48c to the non-inverting inputs of an OR gate 52 which then produces the "b" gating signal on its output as shown in FIG. 1.

Likewise, when the voice energy detector 42c determines that there is voice energy present on line 18c, a trigger signal is produced on line 44c triggering the one shot 46c which then causes the gating signal produced on line 48c to make a transition from a low state to a high state. The gating signal is connected to a noninverting input of the AND gate 24c. The AND gate 24c permits an information stream at the output of re-encrypter 20c to be passed through to the input of the conference bridge 9 on line 26c if the "c" gating signal connected to an inverting input of AND gate 24c is low. The "c" gating signal will be low only if neither of conferees 1 or 2 has obtained access to the bridge and is speaking when conferee 3 begins to speak and is attempting to access the conference bridge. This "c" gating signal is produced by directing the outputs of the one shots 46a and 46b on lines 48a and 48b to the noninverting inputs of an OR gate 54 which then produces the "c" gating signal on its output as shown in FIG. 1.

In the arrangement of FIG. 1, there is a possibility that none of the conferees will be speaking at a particular time. In this situation, everyone will be sending a stream of "0"s to the conference bridge because the outputs of the AND gates 24a, 24b, and 24c will all be "0"s under these conditions. The output of the conference bridge 9 will also be a stream of "0"s which will be decrypted by the decrypters 30a, 30b, and 30c as a random sequence which will be perceived as a noise burst by the conferees 1, 2, and 3. To prevent the occurrence of such noise bursts, the circuit of FIG. 1 includes a silent conferee circuit 56 which simulates the presence of a conferee who only sends encrypted silence to the bridge when all of the real conferees 1, 2, and 3 are silent. Encrypted silence is produced by the conference bridge 9 which is then decrypted as silence by the decrypters 30a, 30b, and 30c and sent to the conferees as such. The silent conferee circuit 56 enclosed in a secure, tamper proof housing includes a silence generator 58 which produces a bit stream representing unencrypted silence such as a stream of "0"s. The output signal of the silence generator 58 is directed to a re-encryptor 60 which encrypts the silence in accordance with the previously described conference encryption algorithm B. The encrypter 60 is synchronized with the other encryption equipment in units "a", "b", and "c" operating in accordance with encryption algorithm B, as shown in FIG. 2. The output of the encryptor 60 is connected to a noninverting input of an AND gate 62. A silent gating signal is connected to an inverting input of the AND gate 62. The AND gate 62 and the state of the silent gating signal act to prevent the silent conferee circuit 56 from obtaining access to the conference bridge 9 when any of the conferees is talking and has already gained access to the bridge 9. The silent gating signal is produced at the output of an OR gate 64 whose noninverting inputs are connected to the outputs of the one shots 46a, 46b, and 46c. The output of the OR gate 64 is high in all cases except when the outputs of the one shots 46a, 46b, and 46c all are low, indicating that none of the conferees is speaking and has access to the conference bridge 9. When the output of the OR gate 64 is high, the silent gating signal sent to the AND gate 62 prevents the output of the encrypter 60 from being sent to the conference bridge 9. When the output of the OR gate 64 is low, the silent gating signal sent to the AND gate 62 permits the AND gate 62 to pass the output of the encryptor 60 to the conference bridge 9.

FIG. 3 shows an example of the invention whereby the conferees are given different priorities of access to the conference bridge 9. In the example of FIG. 2, conferee 1 is given the highest level priority access to the bridge 9. In other words, conferee 1 may gain access to the bridge, and prevent the other conferees from accessing the bridge, at any time regardless of whether or not the other conferees are speaking. Conferee 2 receives the next highest level of priority. Conferee 2 may obtain access to the bridge at any time except when conferee 1 is speaking. Conferee 3 has the lowest priority of any of the actual conferees. Conferee 3 may only gain access to the bridge when neither conferee 1 nor conferee 2 is speaking. The silent conferee circuit 56 has the lowest priority of all and can only gain access to the bridge when none of conferees 1, 2, or 3 is speaking.

FIG. 3 shows the decryption/re-encryption units "a", "b", and "c" of FIG. 1 in schematic block form.

The "a" gating signal for unit "a" is kept in a low state thus giving conferee 1 permanent access to the conference bridge 9. Conferee 1 thus is not gated by any of the other conferees. When conferee 1 is speaking, unit "a" produces a gating signal on line 66 which is the "b" gating signal directed to the AND gate 24b in unit "b". The signal on line 66 is also directed to one input of an OR gate 68 and one input of an OR gate 70. When conferee 2 is speaking, unit "b" produces a signal on line 72 which is directed to one input of the OR gate 68. The output of the OR gate 68 results in the "c" gating signal which is directed to the AND gate 24c in unit "c". The signal on line 72 is also directed to one input of the OR gate 70. When conferee 3 speaks, unit "c" produces a signal on line 74 which is directed to one input of the OR gate 70. The output of the OR gate 70 is the silent gating signal sent to the AND gate 62 in the silent conferee circuit 56.

We claim:

1. A secure teleconferencing apparatus, comprising:
   a decryption circuit for decrypting at least three encrypted information streams;
   a re-encryption circuit for re-encrypting the decrypted information streams; and
   a conference bridge for combining the re-encrypted information streams.

2. The secure teleconferencing apparatus of claim 1, in which the decryption circuit decrypts at least three encrypted information streams in accordance with one or more respective conferee encryption algorithms.

3. The secure teleconferencing apparatus of claim 1, in which the re-encryption circuit re-encrypts at least three information streams in accordance with a single conference encryption algorithm.

4. The secure teleconferencing apparatus of claim 2, in which the re-encryption circuit re-encrypts at least three information streams in accordance with a single conference encryption algorithm.

5. The secure teleconferencing apparatus of claim 3, further comprising a means for synchronizing the re-encryption of the at least three information streams in accordance with the conference encryption algorithm.

6. The secure teleconferencing apparatus of claim 5, in which the re-encryption circuit comprises at least first, second, and third encryption circuits, each for encrypting a respective information stream in accordance with the conference encryption algorithm.

7. The secure teleconferencing apparatus of claim 6, in which the means for synchronizing comprises a common crypto state generator and a common key variable generator connected to the first, second, and third encryption circuits in the re-encryption circuit.

8. The secure teleconferencing apparatus of claim 1, in which at least part of the decryption circuit and the re-encryption circuit are located in a secure, tamper proof housing.

9. The secure teleconferencing apparatus of claim 1, in which the decryption circuit and the encryption circuit are co-located with the conference bridge.

10. The secure teleconferencing apparatus of claim 1, further comprising a gating circuit which denies access to the conference bridge by each information stream when one of the other information streams has been granted access to the conference bridge.

11. The secure teleconferencing apparatus of claim 1, further comprising a gating circuit which directs only one of the three or more re-encrypted information streams to the conference bridge at a time.

12. The secure teleconferencing apparatus of claim 1, further comprising a decryption circuit for decrypting the combined re-encrypted information streams in accordance with a single conference encryption algorithm.

13. The secure teleconferencing apparatus of claim 12, further comprising a re-encryption circuit for re-encrypting in accordance with a respective conferee encryption algorithm the information streams decrypted in accordance with the conference encryption algorithm.

14. The secure teleconferencing apparatus of claim 1, further comprising a silent conferee circuit for directing encrypted silence to the conference bridge when all conferees are silent.

15. A method of obtaining a secure teleconference between three or more conferees, comprising the steps of:
   decrypting at least three encrypted information streams from the three or more conferees;
   re-encrypting the decrypted information streams; and
   combining the re-encrypted information streams in a conference bridge co-located with circuits performing the decrypting and re-encrypting steps.

16. The method of claim 15, further comprising the step of gating only one of the re-encrypted information streams to the conference bridge at a time.

17. The method of claim 15, further comprising the step of directing encrypted silence to the conference bridge when all conferees are silent.

18. The method of claim 15, in which the re-encrypting step comprises the step of re-encrypting each of the three information streams in accordance with a common conference encryption algorithm.

19. A secure teleconferencing apparatus, comprising:
   a conference bridge;
   a gating circuit for directing only one of a plurality of encrypted information streams to the conference bridge at a time; and
   a generator of encrypted silence directed to the conference bridge when all of the plurality of encrypted information streams represent silence.

20. The secure teleconferencing apparatus of claim 19, in which the encrypted information streams are each encrypted in accordance with a common encryption algorithm.

21. A secure teleconferencing apparatus, comprising:
   a conference bridge for combining encrypted information streams from a plurality of conferees; and
   a generator of encrypted silence to be directed to the conference bridge when all the conferees are silent.

22. The secure teleconferencing apparatus of claim 21, in which the encrypted information streams are encrypted in accordance with a common encryption algorithm.

23. A public switched telephone network, comprising:
   at least one central office switching system capable of being configured as a teleconference bridge;
   at least first, second, and third decryption/re-encryption units co-located with the central office switching system for receiving at least first, second, and third information streams from at least first, second, and third conferees, the information streams received from the conferees being encrypted in accordance with respective conferee encryption algorithms;
   the at least first, second, and third decryption/re-encryption units each comprising a means for decrypting the information streams received from the conferees in accordance with respective conferee encryption algorithms and a means for re-encrypting the decrypted information streams in accordance with a single conference encryption algorithm;
   a means for gating the re-encrypted information streams to inputs of a conference bridge formed in the switching system, the conference bridge producing a combined conference output and directing that conference output back to the conferees.

* * * * *